(12) United States Patent
Gu et al.

(10) Patent No.: US 12,474,268 B2
(45) Date of Patent: Nov. 18, 2025

(54) DEVICE AND METHOD FOR MEASURING FLUORESCENCE SIGNAL IN MULTI-ILLUMINATION MODE, AND USE OF THE METHOD

(71) Applicant: Institute of Biophysics, Chinese Academy of Sciences, Beijing (CN)

(72) Inventors: Lusheng Gu, Beijing (CN); Wei Ji, Beijing (CN); Tao Xu, Beijing (CN); Yanhui Fu, Beijing (CN)

(73) Assignee: Institute of Biophysics, Chinese Academy of Sciences, Beijing (CN)

( * ) Notice: Subject to any disclaimer, the term of this patent is extended or adjusted under 35 U.S.C. 154(b) by 1018 days.

(21) Appl. No.: 17/250,412

(22) PCT Filed: Feb. 2, 2020

(86) PCT No.: PCT/CN2020/076033
§ 371 (c)(1),
(2) Date: Jan. 19, 2022

(87) PCT Pub. No.: WO2020/228388
PCT Pub. Date: Nov. 19, 2020

(65) Prior Publication Data
US 2022/0146424 A1    May 12, 2022

(30) Foreign Application Priority Data
May 13, 2019  (CN) .......................... 201910393370.9

(51) Int. Cl.
*G01N 21/64*   (2006.01)
*G02B 21/00*   (2006.01)
(Continued)

(52) U.S. Cl.
CPC ..... *G01N 21/6402* (2013.01); *G01N 21/6458* (2013.01); *G02B 21/0032* (2013.01);
(Continued)

(58) Field of Classification Search
CPC ........... G01N 21/6402; G01N 21/6458; G01N 21/01; G01N 2021/6463;
(Continued)

(56) References Cited

U.S. PATENT DOCUMENTS

| | | | |
|---|---|---|---|
| 2004/0012853 A1* | 1/2004 | Garcia | G02B 21/0068 359/489.08 |
| 2006/0012874 A1* | 1/2006 | Funk | G02B 21/0032 359/388 |

(Continued)

FOREIGN PATENT DOCUMENTS

| | | |
|---|---|---|
| CN | 102540446 A | 7/2012 |
| CN | 102551661 A | 7/2012 |

(Continued)

OTHER PUBLICATIONS

Search Report mailed Jun. 18, 2019, issued in Chinese Patent Application No. 201910393370.9, 8 pages.

(Continued)

*Primary Examiner* — Zachary W Wilkes
*Assistant Examiner* — Anna Smith
(74) *Attorney, Agent, or Firm* — Grossman, Tucker, Perreault & Pfleger, PLLC; Paul J. Kroon, Jr.

(57) ABSTRACT

Disclosed are a device and method for measuring fluorescence signal in multi-illumination mode and use of the method. An excitation light is modulated on an illumination excitation light path, to generates excitation illumination patterns at different phases on a sample after passing through an objective lens; a high-speed switching device is arranged on a fluorescence collection light path to switch the position of a fluorescence image of the sample on a target plane of a photoelectric sensor, and a plurality of sub-images can be simultaneously obtained after one exposure through synchronous operation of multi-illumination excitation light (Continued)

paths and fluorescence imaging light paths, which correspond to fluorescence signals in a plurality of illumination modes.

4 Claims, 5 Drawing Sheets

(51) Int. Cl.
- *G02B 21/04* (2006.01)
- *G02B 26/10* (2006.01)
- *G02B 27/14* (2006.01)
- *G02B 27/28* (2006.01)
- *G02F 1/11* (2006.01)

(52) U.S. Cl.
CPC ..... *G02B 21/0048* (2013.01); *G02B 21/0076* (2013.01); *G02B 21/008* (2013.01); *G02B 21/04* (2013.01); *G02B 26/101* (2013.01); *G02B 27/141* (2013.01); *G02B 27/283* (2013.01); *G02B 27/286* (2013.01); *G02F 1/11* (2013.01)

(58) Field of Classification Search
CPC ........ G01N 2021/0112; G02B 21/0032; G02B 21/0048; G02B 21/0076; G02B 21/008; G02B 21/04; G02B 21/16; G02B 21/0036; G02B 26/101; G02B 26/105; G02B 27/141; G02B 27/283; G02B 27/286; G02F 1/11
See application file for complete search history.

(56) References Cited

U.S. PATENT DOCUMENTS

| | | | |
|---|---|---|---|
| 2013/0314717 A1 | 11/2013 | Yi et al. | |
| 2015/0304552 A1* | 10/2015 | Matsuzaki | G02B 21/18 348/80 |
| 2015/0362713 A1 | 12/2015 | Betzig et al. | |
| 2016/0003740 A1* | 1/2016 | Tao | G01N 21/6428 250/201.3 |
| 2016/0103309 A1* | 4/2016 | Suzuki | G02B 27/145 359/388 |
| 2016/0124208 A1 | 5/2016 | Best et al. | |
| 2017/0108683 A1* | 4/2017 | Miyazono | G02B 21/025 |
| 2017/0343477 A1* | 11/2017 | Santori | G01J 3/18 |

FOREIGN PATENT DOCUMENTS

| | | | |
|---|---|---|---|
| CN | 102866137 A | | 1/2013 |
| CN | 103472042 A | | 12/2013 |
| CN | 103605202 A | | 2/2014 |
| CN | 103926225 A | | 7/2014 |
| CN | 104062750 A | | 9/2014 |
| CN | 104515759 A | | 4/2015 |
| CN | 105758799 A | | 7/2016 |
| CN | 106950208 A | | 7/2017 |
| CN | 106980174 A | | 7/2017 |
| CN | 107092086 A | | 8/2017 |
| CN | 107167929 A | | 9/2017 |
| CN | 107389631 A | | 11/2017 |
| CN | 107966826 A | | 4/2018 |
| CN | 108680544 A | | 10/2018 |
| CN | 109146790 A | | 1/2019 |
| CN | 109541791 A | | 3/2019 |
| CN | 110007453 A | | 7/2019 |
| CN | 209895085 U | | 1/2020 |
| CN | 116031738 A | * | 4/2023 |
| EP | 1256795 A2 | | 11/2002 |
| KR | 101934956 B1 | | 3/2019 |
| WO | 2010101894 A2 | | 9/2010 |
| WO | 2011162186 A1 | | 12/2011 |
| WO | 2011162187 A1 | | 12/2011 |
| WO | 2017205857 A1 | | 11/2017 |

OTHER PUBLICATIONS

Search Report and Written Opinion mailed May 19, 2020, issued in PCT Patent Application No. PCT/CN2020/076033, 14 pages.

Chen Danni. Research on Three-Dimensional Nanometer-Resolution Fluorescence Microscopy Imaging over the Entire Field. China Doctoral Dissertation Full-text Database: Information Technology Edition. Aug. 31, 2011. pp. 1-114.

Gu Lusheng. The development of three-dimensional super-resolution microscopy system and analysis algorithm. China Doctoral Dissertation Full-text Database: Information Technology Edition. Jul. 31, 2016.

Yang Liu, et al. Single-pixel phase and fluorescence microscope. Optics Express vol. 26, Issue 25, pp. 32451-32462 (2018) Dec. 10, 2018, pp. 1-12.

The State Intellectual Property Office of People's Republic of China. First Search Report for CN application No. 2019103933709 with English translation, mailed Sep. 22, 2023, pp. 1-5.

* cited by examiner

DEVICE AND METHOD FOR MEASURING FLUORESCENCE SIGNAL IN MULTI-ILLUMINATION MODE, AND USE OF THE METHOD

CROSS-REFERENCE TO RELATED APPLICATIONS

This application is a national stage filing under 35 U.S.C. § 371 of international application number PCT/CN2020/076033, filed Feb. 20, 2020, which claims priority to Chinese patent application No. 201910393370.9 filed May 13, 2019. The contents of these applications are incorporated herein by reference in their entirety.

TECHNICAL FIELD

The present disclosure relates to the technical field of fluorescence signal measurement, and in particular, to a device and a method for measuring fluorescence signal in multi-illumination mode, and use of the method.

BACKGROUND

A conventional optical microscope has a resolution limit of about 200 nm in the lateral direction and about 500 nm in the axial direction due to light diffraction. In recent years, super-resolution microscopic imaging technology based on single molecule localization can break through this resolution limit. This imaging technology relies on the accurate localization of the fluorescence signal of a single molecule, so the accuracy of localization of a single molecule directly affects the resolution. A common localization method is to perform image fitting on the single molecule image in the fluorescence image, and estimate the center of the image to obtain the position of the single molecule. However, this method cannot make full use of the numerical aperture of the objective lens, which limits the improvement of localization accuracy. Meanwhile, the localization method based on image fitting is also affected by the shape of single molecule image, which further leads to a decrease in the localization accuracy. Besides, light emitted by the single molecule discontinuous with flickering and bleaching phenomena, resulting in poor localization accuracy and long imaging time. Therefore, solving the above problems is of great significance and application value for single molecule images.

SUMMARY

In order to reduce the influence of sample changes on the existing multi-illumination mode fluorescence measurement, the present disclosure provides a device and a method for measuring fluorescence signal in multi-illumination mode, and use of the method. By synchronizing the modulation of excitation light, the turning off of light source and the imaging of fluorescence signals at different phases on a target plane of a photoelectric sensor, measurement of rapidly changing fluorescence signal in multi-illumination mode can be realized. By using excitation illumination patterns at different phases and in different directions, the fluorescence signal of single molecule can be measured, and the localization accuracy of single molecule can be improved.

The purpose of the present disclosure is achieved through the following technical schemes.

First, a device for measuring fluorescence signal in multi-illumination mode includes a multi-illumination excitation system configured to generate multi-illumination excitation patterns at different phases in X and Y directions to excite a sample; a fluorescence imaging system configured to collect and scan fluorescence sub-images generated by excitation illumination patterns at different phases, so that one fluorescence image contains N fluorescence sub-images, and a signal control and processing system configured to control on-off of excitation light from the multi-illumination excitation system, phase transformation of modulation devices, scanning of a resonance galvanometer scanner, sequence and rapid switching of various parts, and processing of fluorescence image.

Further, the multi-illumination excitation system includes a laser having a light path on which an acousto-optic modulator, a first half-wave plate, an analyzer, a first electro-optic modulator, and a first polarizing beam splitter are sequentially provided;

a light beam passes through the first polarizing beam splitter to be divided into two light paths including a light path A and a light path B;

a second half-wave plate, a second electro-optic modulator, a first beam expander, and a second polarizing beam splitter are sequentially provided on the light path A; the second polarizing beam splitter provides two light paths, including a first light path on which a first mirror, a third half-wave plate, and a third mirror are sequentially provided, and a second light path on which a fourth half-wave plate and a second mirror are sequentially provided; and the two light paths then sequentially pass through a fourth mirror and a fifth mirror;

a fifth half-wave plate, a third electro-optic modulator, a second beam expander, and a third polarizing beam splitter are sequentially provided on the light path B; the third polarizing beam splitter provides two light paths, including a first light path on which a sixth mirror, a sixth half-wave plate, and a seventh mirror are sequentially provided, and a second light path on which a seventh half-wave plate and a ninth mirror are sequentially provided; and the two light paths then sequentially pass through an eighth mirror;

reflected light paths of the fifth mirror and the eighth mirror respectively enter a fourth polarizing beam splitter having a light exit path on which a first lens is provided; and a light path of the first lens enters a dichroic beam splitter of the fluorescence imaging system.

Further, the fluorescence imaging system includes an objective lens, a dichroic beam splitter, a second lens, a diaphragm, a third lens, a fourth lens, the resonance galvanometer scanner, a fifth lens group, a sixth lens group, and a photoelectric sensor; the dichroic beam splitter, the objective lens and the sample are on a same light path; the second lens, the diaphragm, the third lens, the fourth lens, and the resonance galvanometer scanner are sequentially provided on a light-split path of the dichroic beam splitter; the fifth lens group, the sixth lens group, and the photoelectric sensor are sequentially provided on another light path of the resonance galvanometer scanner; the fifth lens group and the sixth lens group each include six sub-lenses, and the six sub-lenses are configured for collecting fluorescence signals at different phases.

Preferably, the laser has a light source that is continuous and operated in single longitudinal mode; each of the modulators has a conversion frequency of at least 1 MHz; and the resonance galvanometer scanner has a scan frequency of at least 4 kHz.

The present disclosure also provides a method for measuring fluorescence signal in multi-illumination mode, including:

(1) emitting, by a light source, excitation lights which are modulated by modulation devices and irradiated on a sample through an objective lens to form controllable excitation illumination patterns, wherein the modulation devices are configured to control switching of N excitation illumination patterns and on/off of the excitation lights;

(2) exciting, by a first excitation illumination pattern, the sample to emit fluorescence signals which are collected by the objective lens, converged on a mirror plane of a resonance galvanometer scanner, scanned rapidly by the resonance galvanometer scanner, converged to a first position of a target plane of a photoelectric sensor through a first one of N groups of conjugate lenses, and integrated; switching to a second excitation illumination pattern to excite the sample to emit fluorescence signals which are collected by the objective lens, converged on the mirror plane of the resonance galvanometer scanner, scanned rapidly by the resonance galvanometer scanner, converged to a second position of the target plane of the photoelectric sensor through a second one of the N groups of conjugate lenses, and integrated; and performing switching of excitation illumination pattern for N times; and (3) repeating step (2) for a plurality of times during exposure of the photoelectric sensor, to obtain a fluorescence signal image including N fluorescence sub-images after a final exposure, and processing and analyzing the fluorescence signal image.

Preferably, when a fluorescence beam is at a junction of two groups of lenses, the excitation light is off; and when the fluorescence beam is completely located in a clear aperture of a group of conjugate lenses, the excitation light is on.

In one exposure period, the resonance galvanometer scanner is required to perform cyclical scanning for a plurality of periods. For a same excitation illumination pattern, the fluorescence signals corresponding to the one exposure period are integrated at a same part of the target plane of the photoelectric sensor, and after the final exposure, the N fluorescence sub-images are obtained on the photoelectric sensor simultaneously, which respectively correspond to the N different excitation illumination patterns. One exposure period refers to a time period in which the photoelectric sensor receives enough signals to form a clear image.

A fluorescence beam is focused on the mirror plane of the resonance galvanometer scanner, and the mirror plane of the resonance galvanometer scanner is located at a focus of the conjugate lens group.

Use of the method for measuring fluorescence signal in multi-illumination mode is provided. When the illumination patterns are fringes in X and Y directions at different phases, the method is used for localization measurement of fluorescence single molecule. When the illumination patterns are in different directions and there are a plurality of fringes at different phases in each direction, the method is used for structured illumination microscopic imaging.

The present disclosure provides a method and a device for measuring fluorescence signal in multi-illumination mode. According to the present disclosure, the excitation light is excited by illumination patterns at different phases, and the light source and illumination patterns at different phases are quickly switched to realize display of sub-images at different phases in one image; then the phases of a single molecule relative to illumination fringes are calculated according to the brightness of the single molecule in different illumination patterns, and then the position is analyzed according to the phases, thereby realizing higher localization accuracy and faster imaging speed. With this technology, the fluorescence signals of a single molecule under a plurality of different illumination modes can be measured, and the influence of factors such as bleaching of the fluorescent molecule itself can be minimized By this method, and in combination with fringe illumination modes at different phases, interferometric measurement of single molecule can be realized. Compared with previous localization methods, this method has the advantages of high accuracy and is not affected by single molecule flickering and bleaching.

By the device and method for measuring fluorescence signal in multi-illumination mode and use of the method according to the present disclosure, based on excitation and sequential control of illumination excitation patterns at different phases, errors caused by single molecule brightness flicker can be effectively eliminated, improving the signal-to-noise ratio and mitigating the problem of bleaching of fluorescent dyes and the like.

Compared with the related technologies, the present disclosure has the following significant advantages:

(1) in this measuring method, the fluorescence signals of a sample in different illumination excitation patterns can be measured, which can effectively eliminate the influence caused by changes of the sample and single molecule fluorescence flicker.

(2) in this measuring method, based on the excitation of illumination excitation patterns at different phases, the localization accuracy of single molecule can be significantly improved, and the resolution of super-resolution microscopic imaging can be improved at the same time.

Figure 1:
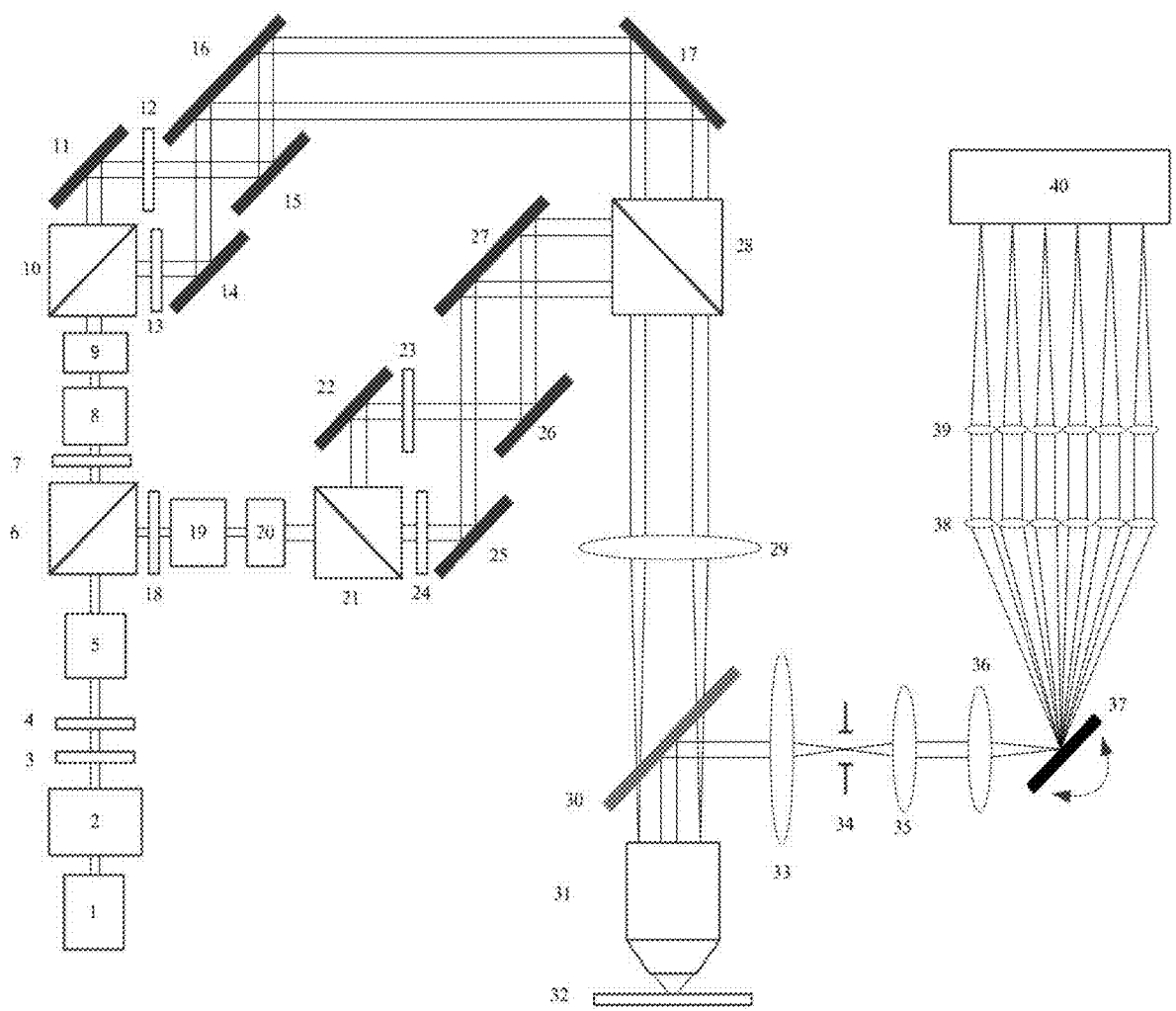
FIG. 1 shows a schematic diagram of a device for measuring fluorescence signal in multi-illumination mode according to the present disclosure.

LIST OF REFERENCE NUMERALS 1 laser
2 acousto-optic modulator 3 first half-wave plate
4 analyzer
5 first electro-optic modulator
6 first polarizing beam splitter
7 second half-wave plate
8 second electro-optic modulator
9 first beam expander
10 second polarizing beam splitter
11 first mirror
12 third half-wave plate
13 fourth half-wave plate
14 second mirror
15 third mirror
16 fourth mirror
17 fifth mirror
18 fifth half-wave plate
19 third electro-optic modulator
20 second beam expander
21 third polarizing beam splitter
22 sixth mirror
23 sixth half-wave plate
24 seventh half-wave plate
25 ninth mirror
26 seventh mirror
27 eighth mirror
28 fourth polarizing beam splitter
29 first lens
30 dichroic beam splitter
31 objective lens
32 sample
33 second lens
34 diaphragm
35 third lens
36 fourth lens
37 resonance galvanometer scanner
38 fifth lens group
39 sixth lens group
40 photoelectric sensor
41 signal control and processing system
42 multi-illumination excitation system
43 fluorescence imaging system

DETAILED DESCRIPTION

The present disclosure will be further described below in conjunction with the accompanying drawings and embodiments.

The basic idea of the present disclosure is to realize high-precision localization of single molecule fluorescence signal based on control of excitation of illumination excitation patterns and sequential control on receiving fluorescence signal.

The present disclosure will be described in detail in the following by taking measurement of an actual single molecule fluorescence signal as an example with reference to the accompanying drawings.

As shown in FIG. 1, a device for measuring fluorescence signal in multi-illumination mode has the following structure.

The device includes a multi-illumination excitation system 42, a fluorescence imaging system 43, and a signal control and processing system 41. The multi-illumination excitation system 42 is configured to generate multi-illumination excitation patterns at different phases in X and Y directions to excite a sample. The fluorescence imaging system 43 is configured to collect and scan fluorescence sub-images generated by excitation illumination patterns at different phases, so that one fluorescence image contains N fluorescence sub-images. The signal control and processing system 41 is configured to control on-off of excitation light from the multi-illumination excitation system 42, phase transformation of modulation devices, scanning of a resonance galvanometer scanner, and sequential and rapid switching of various parts. The processing of fluorescence image is further included.

The multi-illumination excitation system 42 includes a laser 1. An acousto-optic modulator 2, a first half-wave plate 3, an analyzer 4, a first electro-optic modulator 5, and a first polarizing beam splitter 6 are sequentially provided on a light path of the laser 1.

After passing through the first polarizing beam splitter 6, a light beam is divided into two light paths, namely a light path A and a light path B.

A second half-wave plate 7, a second electro-optic modulator 8, a first beam expander, and a second polarizing beam splitter 10 are sequentially provided on the light path A. The second polarizing beam splitter 10 provides two light paths, including a first light path in which a first mirror 11, a third half-wave plate 12, and a third mirror 15 are sequentially provided, and a second light path in which a fourth half-wave plate 13 and a second mirror 14 are sequentially provided. The two light paths then sequentially pass through a fourth mirror 16 and a fifth mirror 17.

A fifth half-wave plate 18, a third electro-optic modulator 19, a second beam expander 20, and a third polarizing beam splitter 21 are sequentially provided on the light path B. The third polarizing beam splitter 21 provides two light paths, including a first light path in which a sixth mirror 22, a sixth half-wave plate 23, and a seventh mirror 26 are sequentially provided, and a second light path in which a seventh half-wave plate 24 and a ninth mirror 25 are sequentially provided. The two light paths then sequentially pass through an eighth mirror 27.

Reflected light paths from the fifth mirror 17 and the eighth mirror 27 respectively enter a fourth polarizing beam splitter 28. A first lens 29 is provided on a light exit path of the fourth polarizing beam splitter 28. A light path of the first lens 29 enters a dichroic beam splitter 30 of the fluorescence imaging system 43.

The fluorescence imaging system 43 includes an objective lens 31, a dichroic beam splitter 30, a second lens 33, a diaphragm 34, a third lens 35, a fourth lens 36, a resonance galvanometer scanner 37, a fifth lens group 38, a sixth lens group 39, and a photoelectric sensor 40. The dichroic beam splitter 30, the objective lens 31 and the sample 32 are on a same light path. The second lens 33, the diaphragm 34, the third lens 35, the fourth lens 36, and the resonance galvanometer scanner 37 are sequentially provided on one light-split path of the dichroic beam splitter 30; and the fifth lens group 38, the sixth lens group 39, and the photoelectric sensor 40 are sequentially provided on another light path of the resonance galvanometer scanner 37. The fifth lens group 38 and the sixth lens group 39 each include six sub-lenses, and the six sub-lenses are configured for collecting fluorescence signals at different phases.

The signal control and processing system 41 controls the laser 1 to emit excitation light. Output intensity of the excitation light is controlled by the acousto-optic modulator 2, polarization direction of the excitation light is changed through the first half-wave plate 3 and the analyzer 4 and is modulated through the first electro-optic modulator 5. The excitation light is switched between the two different light paths A and B by the first polarizing beam splitter 6 according to different polarization directions.

Figure 4:
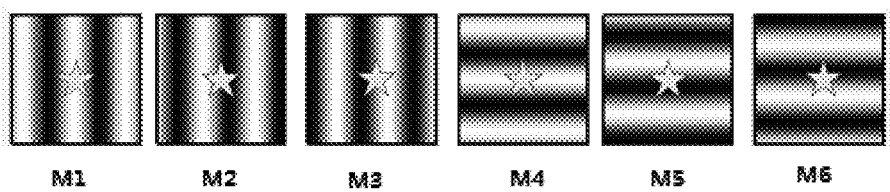
FIG. 4 shows interference fringe patterns of excitation illumination with different directions and phases generated by the illumination excitation system according to the present disclosure.
Figure 5:
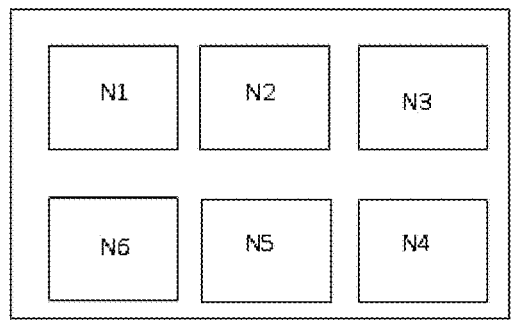
FIG. 5 shows a schematic diagram of a target plane of a photoelectric sensor according to the present disclosure.

The excitation light passes through the second half-wave plate 7 and the second electro-optic modulator 8 on the light path A to be changed in polarization direction and phase difference between p-light and s-light. The excitation light is expanded by the first beam expander 9, and then is divided into two excitation sub-beams a and b in different vibration directions through the second polarizing beam splitter 10. The excitation sub-beams a and b respectively pass through the first mirror 11, the third half-wave plate 12, the fourth mirror 16 and the fourth half-wave plate 13, the second mirror 14, the third mirror 15, and then pass through the fifth mirror 17, the fourth polarizing prism 28, the first lens 29, the dichroic beam splitter 30, and the objective lens 31 to be focused on the sample 32, resulting in interference to generate an excitation interference illumination fringe pattern M1 in an X direction (as shown in FIG. 4). The excitation interference illumination fringe pattern M1 excites the sample 32 to emit fluorescence signals which pass through the objective lens 31, the dichroic beam splitter 30, the second lens 33, the diaphragm 34, the third lens 35, and the fourth lens 36; and an image is formed on a mirror plane of the resonance galvanometer scanner 37, and the fluorescence signals are scanned by the resonance galvanometer scanner 37 and then pass through corresponding sub-lenses in the corresponding fifth lens group 38 and sixth lens group 39. Then, the fluorescence signals are converged at a position N1 of the target plane (as shown in FIG. 5) of the photoelectric sensor 40, and are integrated. When the fluorescence beam scanned by the resonance galvanometer scanner 37 is at the edge of the corresponding sub-lenses in the fifth lens group 38 and the sixth lens group 39, the signal control and processing system 41 controls the light source 1 to be turned off.

The signal control and processing system 41 controls the generation of an excitation interference illumination fringe pattern M2 in the X direction. The excitation interference illumination fringe pattern M2 excites the sample 32 to emit fluorescence signals which pass through the objective lens 31, the dichroic beam splitter 30, the second lens 33, the diaphragm 34, the third lens 35, and the fourth lens 36; and an image is formed on the mirror plane of the resonance galvanometer scanner 37, and the fluorescence signals are scanned by the resonance galvanometer scanner 37 and then pass through the corresponding sub-lenses in the corresponding fifth lens group 38 and sixth lens group 39. Then, the fluorescence signals are converged at a position N2 of the target plane of the photoelectric sensor 40, and are integrated. When the fluorescence beam scanned by the resonance galvanometer scanner 37 is at the edge of the corresponding sub-lenses in the fifth lens group 38 and the sixth lens group 39, the signal control and processing system 41 controls the light source 1 to be turned off.

The signal control and processing system 41 controls the generation of an excitation interference illumination fringe pattern M3 in the X direction. The excitation interference illumination fringe pattern M3 excites the sample 32 to emit fluorescence signals which pass through the objective lens 31, the dichroic beam splitter 30, the second lens 33, the diaphragm 34, the third lens 35 and the fourth lens 36; then an image is formed on the mirror plane of the resonance galvanometer scanner 37, and the fluorescence signals are scanned by the resonance galvanometer scanner 37 and then pass through the corresponding sub-lenses in the corresponding fifth lens group 38 and sixth lens group 39. Then, the fluorescence signals are converged at a position N3 of the target plane of the photoelectric sensor 40, and are integrated. When the fluorescence beam scanned by the resonance galvanometer scanner 37 is at the edge of the corresponding sub-lenses in the fifth lens group 38 and the sixth lens group 39, the signal control and processing system 41 controls the light source 1 to be turned off.

The signal control and processing system 41 controls the light source 1 to be turned on to generate an excitation light. The excitation light passes through the fifth half-wave plate 18 and the third electro-optic modulator 19 on another light path B to be changed in polarization direction and phase difference between p-light and s-light. The excitation light is expanded by the second beam expander 20, and then divided into two excitation sub-beams c and d in different vibration directions through the third polarizing beam splitter 21. The excitation sub-beams c and d respectively pass through the sixth mirror 22, the sixth half-wave plate 23, the eighth mirror 27, and the seventh half-wave plate 24, the ninth mirror 25, the seventh mirror 26, and then pass through the fourth polarizing beam splitter 28, the first lens 29, the dichroic beam splitter 30, and the objective lens 31 to be focused on the sample 32, resulting in interference to generate an excitation interference illumination fringe pattern M4 in the Y direction.

The excitation interference illumination fringe pattern M4 excites the sample 32 to emit fluorescence signals which pass through the objective lens 31, the dichroic beam splitter 30, the second lens 33, the diaphragm 34, the third lens 35, and the fourth lens 36; then an image is formed on the mirror plane of the resonance galvanometer scanner 37, and the fluorescence signals are scanned by the resonance galvanometer scanner 37 and then passes through the corresponding sub-lenses in corresponding fifth lens group 38 and sixth lens group 39. Then, the fluorescence signals are converged at a position N4 of the target plane of the photoelectric sensor 40, and are integrated. When the fluorescence beam scanned by the resonance galvanometer scanner 37 is at the edge of the corresponding sub-lenses in the fifth lens group 38 and the sixth lens group 39, the signal control and processing system 41 controls the light source 1 to be turned off.

The signal control and processing system 41 controls the generation of an excitation interference illumination fringe pattern M5 in the Y direction. The excitation interference illumination fringe pattern M5 excites the sample 32 to emit fluorescence signals which pass through the objective lens 31, the dichroic beam splitter 30, the second lens 33, the diaphragm 34, the third lens 35, and the fourth lens 36; then an image is formed on the mirror plane of the resonance galvanometer scanner 37, and the fluorescence signals are scanned by the resonance galvanometer scanner 37 and then pass through the corresponding sub-lenses in the corresponding fifth lens group 38 and sixth lens group 39. Then, the fluorescence signals are converged at a position N5 of the target plane of the photoelectric sensor 40, and are integrated. When the fluorescence beam scanned by the resonance galvanometer scanner 37 is at the edge of the corresponding sub-lenses in the fifth lens group 38 and the sixth lens group 39, the signal control and processing system 41 controls the light source 1 to be turned off.

Figure 2:
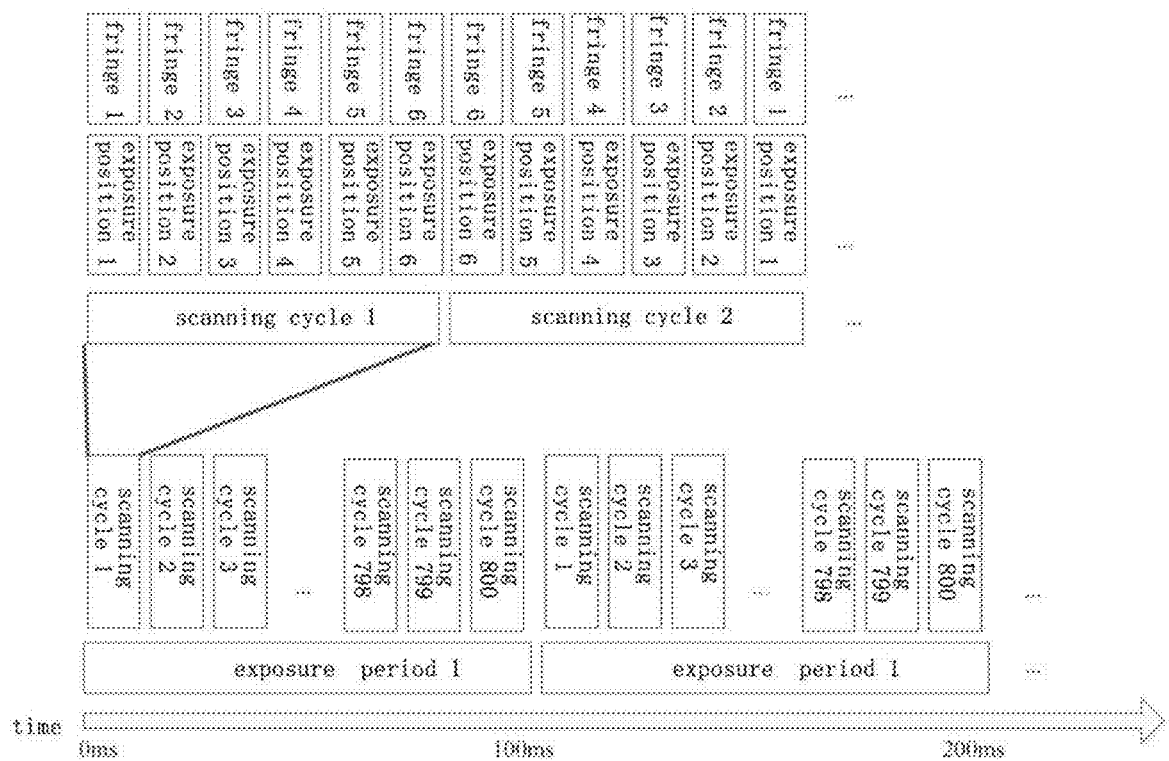
FIG. 2 shows a schematic diagram of an image acquisition process for measuring fluorescence signal in multi-illumination mode according to the present disclosure.

The signal control and processing system 41 controls the generation of an excitation interference illumination fringe pattern M6 in the Y direction. The excitation interference illumination fringe pattern M6 excites the sample 32 to emit fluorescence signals which pass through the objective lens 31, the dichroic beam splitter 30, the second lens 33, the diaphragm 34, the third lens 35 and the fourth lens 36; then an image is formed on the mirror plane of the resonance galvanometer scanner 37, and the fluorescence signals are scanned by the resonance galvanometer scanner 37 and then pass through the corresponding sub-lenses in the corresponding fifth lens group 38 and sixth lens group 39. Then, the fluorescence signals are converged at a position N6 of the target plane of the photoelectric sensor 40, and are integrated. When the fluorescence beam scanned by the resonance galvanometer scanner 37 is at the edge of the corresponding sub-lenses in the fifth lens group 38 and the sixth lens group 39, the signal control and processing system 41 controls the light source 1 to be turned off. In this way, a scanning cycle period (as shown in FIG. 2) of the resonance galvanometer scanner 37 is completed. One scanning cycle period includes six fringe cycles, that is, for example, if an exposure time of each fringe cycle is 20 μs, the cycle time of one-way scanning of the galvanometer is 125 μs.

Figure 6:
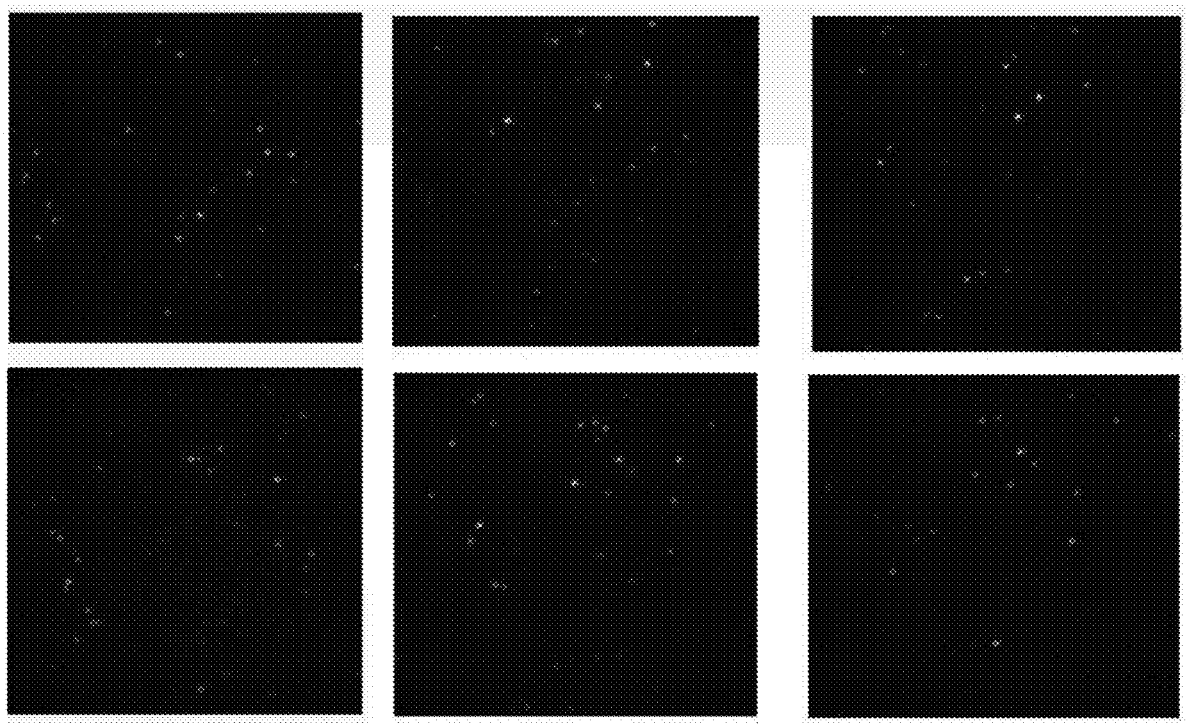
FIG. 6 shows a schematic diagram of a fluorescence image containing six fluorescence sub-images according to the present disclosure.

In one exposure period, the resonance galvanometer scanner 37 scans for a plurality of times. For the same excitation interference fringe pattern, corresponding fluorescence signals are integrated in a corresponding part of the target plane of the photoelectric sensor 40. Finally, six fluorescence sub-images can be obtained in each fluorescence image within one exposure period (as shown in FIG. 6), which correspond to six different excitation interference fringe patterns. For example, if the exposure time of the photoelectric sensor 40 is 100 ms, the galvanometer will perform 400 scanning cycles to achieve 800 times of signal integration for each fringe.

Figure 3:
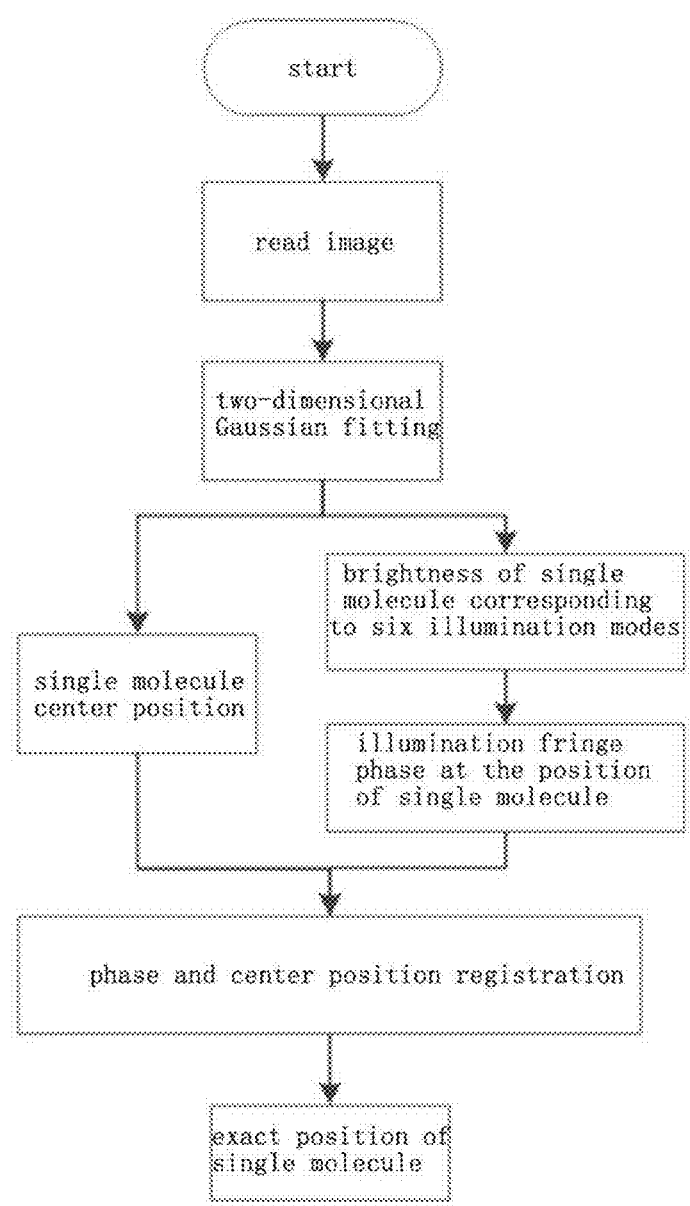
FIG. 3 shows a schematic diagram of an image processing flow for measuring fluorescence signal in multi-illumination mode according to the present disclosure.
Figure 8:
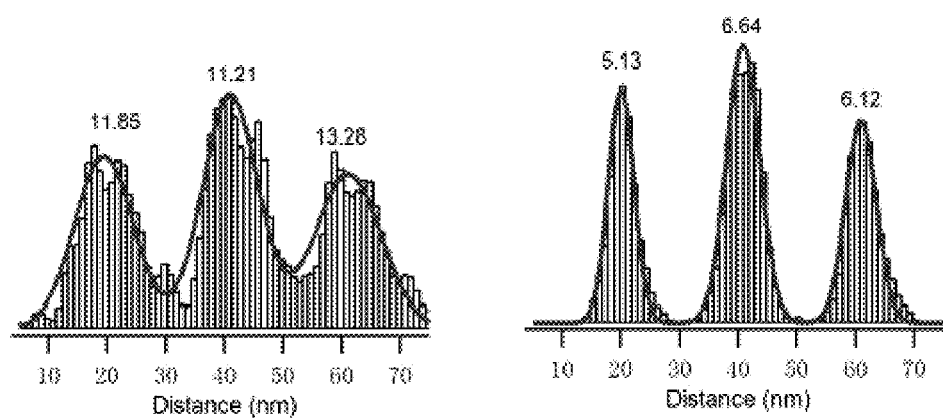
FIG. 8 shows a schematic diagram of resolution comparison between the fluorescence signal image obtained according to the present disclosure and the conventional fluorescence signal image.

The signal control and processing system 41 performs signal processing according to the obtained image (as shown in FIG. 3). First, according to the obtained fluorescence image, a rough position of a single molecule and phase information of the illumination fringe at the position where each single molecule is located are calculated according to the brightness of the single molecule in the six sub-images of each image using two-dimensional Gaussian fitting, and then precise position information of the single molecule is calculated by registering the phase with a central position according to these two kinds of data (as shown in FIG. 8).

Probability of photon emission at different phases in X direction is as follows:

$$p(x; P) = \begin{cases} \left(\sin\left(P - \frac{2}{3}\pi\right) + 1\right)/3 & (x=1) \\ (\sin(P) + 1)/3 & (x=2) \\ \left(\sin\left(P - \frac{2}{3}\pi\right) + 1\right)/3 & (x=3) \end{cases}$$

Probability of photon emission at different phases in Y direction is as follows:

$$p(y; P) = \begin{cases} \left(\sin\left(P - \frac{2}{3}\pi\right) + 1\right)/3 & (y=1) \\ (\sin(P) + 1)/3 & (y=2) \\ \left(\sin\left(P - \frac{2}{3}\pi\right) + 1\right)/3 & (y=3) \end{cases}$$

Fisher information:

$$I_x = E\left[\left(\frac{\partial \log(p(x;P))}{\partial P}\right)^2\right]; I_y = E\left[\left(\frac{\partial \log(p(y;P))}{\partial P}\right)^2\right]$$

Cramer-Rao Lower Bound (CLRB):

$$CRLB_{x,y} = \frac{\lambda}{2\sqrt{2}\pi * N.A. * \sqrt{N}}$$

where λ is the wavelength of the excitation light, NA is the numerical aperture of the objective lens, and N is the total number of photons collected.

Figure 7:
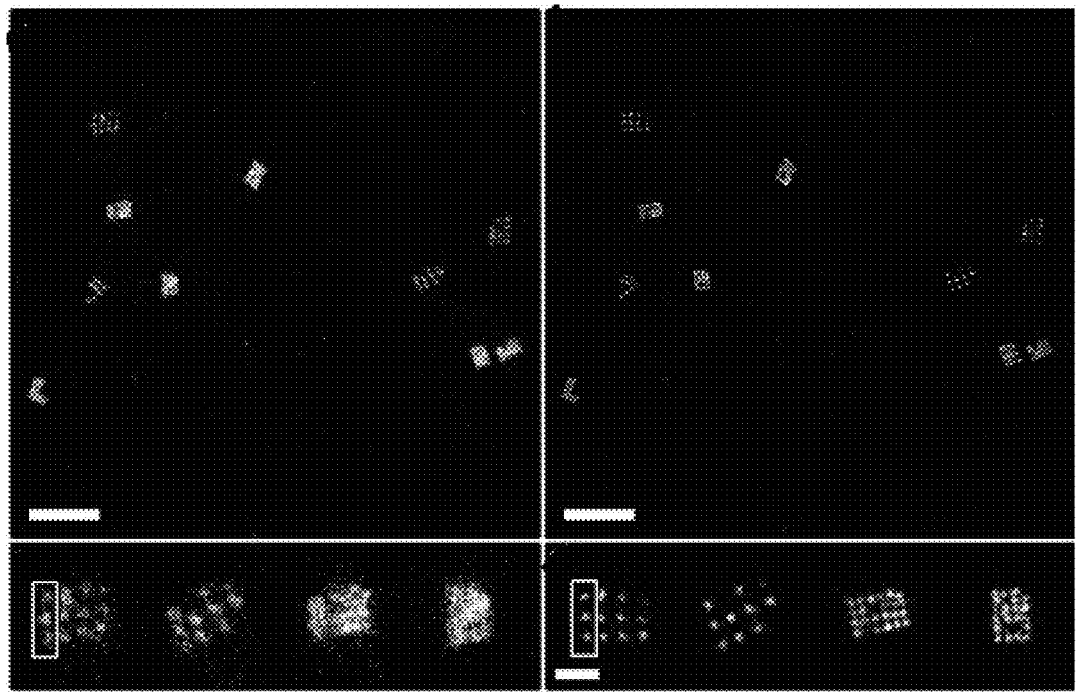
FIG. 7 shows a schematic diagram of comparison between a fluorescence signal image obtained according to the present disclosure and a conventional fluorescence signal image.

In this embodiment, high-precision localization of fluorescence signals is realized through a series of measures. As shown in FIG. 4 and FIG. 5, it can be seen that according to the device for measuring fluorescence signal and method provided by the present disclosure, excitation interference fringe patterns are used to excite fluorescence signals to achieve synchronization and data acquisition. Compared with the conventional localization method (as shown in FIG. 7), localization errors caused by flicker, bleaching and short luminous period of fluorescent molecules are maximally avoided, thus ensuring the acquisition of ultra-high-precision localization information.

The specific embodiments of the present disclosure have been described above with reference to the accompanying drawings, which however should not be interpreted as limiting the scope of the present disclosure. The protection scope of the present disclosure is defined by the appended claims, and any modification made based on the claims of the present disclosure shall fall into the protection scope of the present disclosure.

What is claimed is:

1. A device for measuring fluorescence signal under multi-illumination mode, comprising:
   an excitation system configured to generate multi-illumination excitation patterns at different phases in X and Y directions to excite a sample;
   a fluorescence imaging system configured to collect fluorescent signals and switch between fluorescence sub-images corresponding to excitation illumination patterns, so that one fluorescence image contains N fluorescence sub-images, and
   a signal control and processing system configured to control on-off of excitation light from the excitation system, phase shift of modulation devices, synchronization with the scanning of a resonance scanner, and processing of fluorescence image;
   wherein the excitation system comprises a laser having an optical path on which an acousto-optic modulator, a first half-wave plate, an analyzer, a first electro-optic modulator, and a first polarizing beam splitter are sequentially provided;
   a light beam passes through the first polarizing beam splitter to be divided into two optical paths comprising an optical path A and an optical path B;
   a second half-wave plate, a second electro-optic modulator, a first beam expander, and a second polarizing beam splitter are sequentially provided on the optical path A; the second polarizing beam splitter provides two optical paths, comprising a first optical path on which a first mirror, a third half-wave plate, and a third mirror are sequentially provided, and a second optical path on which a fourth half-wave plate and a second mirror are sequentially provided; and the two optical paths then sequentially pass through a fourth mirror and a fifth mirror;
   a fifth half-wave plate, a third electro-optic modulator, a second beam expander, and a third polarizing beam splitter are sequentially provided on the optical path B; the third polarizing beam splitter provides two optical paths, comprising a first optical path on which a sixth mirror, a sixth half-wave plate, and a seventh mirror are sequentially provided, and a second optical path on which a seventh half-wave plate and a ninth mirror are sequentially provided; and the two optical paths then sequentially pass through an eighth mirror;

reflected optical paths of the fifth mirror and the eight mirror respectively enter a fourth polarizing beam splitter having a light exit path on which a first lens is provided;

and an optical path of the first lens enters a dichroic beam splitter of the fluorescence imaging system.

2. The device for measuring fluorescence signal under multi-illumination mode of claim 1, wherein the laser has a light source that is continuous and operated in single longitudinal mode; each of the modulators has a response frequency of at least 1 MHz; and the resonance scanner has a scanning frequency of at least 4 kHz.

3. A device for measuring fluorescence signal under multi-illumination mode, comprising:
- an excitation system configured to generate multi-illumination excitation patterns at different phases in X and Y directions to excite a sample;
- a fluorescence imaging system configured to collect fluorescent signals and switch between fluorescence sub-images corresponding to excitation illumination patterns, so that one fluorescence image contains N fluorescence sub-images, and
- a signal control and processing system configured to control on-off of excitation light from the excitation system, phase shift of modulation devices, synchronization with the scanning of a resonance scanner, and processing of fluorescence image;
- wherein the fluorescence imaging system comprises an objective lens, a dichroic beam splitter, a second lens, a diaphragm, a third lens, a fourth lens, the resonance scanner, a fifth lens group, a sixth lens group, and a photoelectric sensor; the dichroic beam splitter, the objective lens and the sample are on a same optical path; the second lens, the diaphragm, the third lens, the fourth lens, and the resonance scanner are sequentially provided on a transmission path of the dichroic beam splitter; the fifth lens group, the sixth lens group, and the photoelectric sensor are sequentially provided on another optical path of the resonance scanner; and the fifth lens group and the sixth lens group each comprise six sub-lenses, and the six sub-lenses are configured for collecting fluorescence signals at different phases.

4. A device for measuring fluorescence signal under multi-illumination mode, comprising:
- an excitation system configured to generate multi-illumination excitation patterns at different phases in X and Y directions to excite a sample;
- a fluorescence imaging system configured to collect fluorescent signals and switch between fluorescence sub-images corresponding to excitation illumination patterns, so that one fluorescence image contains N fluorescence sub-images, and
- a signal control and processing system configured to control on-off of excitation light from the excitation system, phase shift of modulation devices, synchronization with the scanning of a resonance scanner, and processing of fluorescence image;
- wherein the excitation system comprises a laser having an optical path on which an acousto-optic modulator, a first half-wave plate, an analyzer, a first electro-optic modulator, and a first polarizing beam splitter are sequentially provided;
- a light beam passes through the first polarizing beam splitter to be divided into two optical paths comprising an optical path A and an optical path B;
- a second half-wave plate, a second electro-optic modulator, a first beam expander, and a second polarizing beam splitter are sequentially provided on the optical path A; the second polarizing beam splitter provides two optical paths, comprising a first optical path on which a first mirror, a third half-wave plate, and a third mirror are sequentially provided, and a second optical path on which a fourth half-wave plate and a second mirror are sequentially provided; and the two optical paths then sequentially pass through a fourth mirror and a fifth mirror;
- a fifth half-wave plate, a third electro-optic modulator, a second beam expander, and a third polarizing beam splitter are sequentially provided on the optical path B; the third polarizing beam splitter provides two optical paths, comprising a first optical path on which a sixth mirror, a sixth half-wave plate, and a seventh mirror are sequentially provided, and a second optical path on which a seventh half-wave plate and a ninth mirror are sequentially provided; and the two optical paths then sequentially pass through an eighth mirror;
- reflected optical paths of the fifth mirror and the eight mirror respectively enter a fourth polarizing beam splitter having a light exit path on which a first lens is provided;
- and an optical path of the first lens enters a dichroic beam splitter of the fluorescence imaging system;
- wherein the fluorescence imaging system comprises an objective lens, a dichroic beam splitter, a second lens, a diaphragm, a third lens, a fourth lens, the resonance scanner, a fifth lens group, a sixth lens group, and a photoelectric sensor; the dichroic beam splitter, the objective lens and the sample are on a same optical path; the second lens, the diaphragm, the third lens, the fourth lens, and the resonance scanner are sequentially provided on a transmission path of the dichroic beam splitter; the fifth lens group, the sixth lens group, and the photoelectric sensor are sequentially provided on another optical path of the resonance scanner; and the fifth lens group and the sixth lens group each comprise six sub-lenses, and the six sub-lenses are configured for collecting fluorescence signals at different phases; and
- wherein the laser has a light source that is continuous and operated in single longitudinal mode; each of the modulators has a response frequency of at least 1 MHz; and the resonance scanner has a scanning frequency of at least 4 kHz.

* * * * *